United States Patent
Lee

(10) Patent No.: US 7,830,780 B2
(45) Date of Patent: Nov. 9, 2010

(54) INFORMATION STORAGE MEDIUM, AND RECORDING/REPRODUCING APPARATUS AND METHOD

(75) Inventor: Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/545,256

(22) Filed: Aug. 21, 2009

(65) Prior Publication Data

US 2009/0310474 A1      Dec. 17, 2009

Related U.S. Application Data

(62) Division of application No. 11/177,595, filed on Jul. 11, 2005, now Pat. No. 7,652,973.

(30) Foreign Application Priority Data

Jul. 10, 2004   (KR) ............................... 2004-53784

(51) Int. Cl.
*G11B 7/24* (2006.01)
(52) U.S. Cl. .................................. 369/275.3
(58) Field of Classification Search ............ 369/275.3, 369/275.1, 275.2, 275.4; 428/64.1; 430/321, 430/270.13
See application file for complete search history.

(56) References Cited

U.S. PATENT DOCUMENTS

| | | | |
|---|---|---|---|
| 7,164,640 B2 | 1/2007 | Sasaki | |
| 7,298,689 B2 | 11/2007 | Lee et al. | |
| 7,376,333 B2 | 5/2008 | Chung et al. | |
| 7,499,383 B2 * | 3/2009 | Park et al. | 369/47.14 |
| 2004/0114474 A1 * | 6/2004 | Park et al. | 369/30.05 |
| 2004/0120233 A1 * | 6/2004 | Park et al. | 369/47.13 |

(Continued)

FOREIGN PATENT DOCUMENTS

EP        1329888        7/2003

(Continued)

OTHER PUBLICATIONS

ECMA: "120 mm DVD-Read Only Disk" 3rd Edition, Apr. 30, 2001.

(Continued)

*Primary Examiner*—Tan X Dinh
(74) *Attorney, Agent, or Firm*—NSIP Law

(57) ABSTRACT

An information storage medium, and a recording/reproducing apparatus and method, the information storage medium including a plurality of recording layers, each layer including a lead-in area or a lead-out area, a data area, a middle area, and a dedicated area, wherein the data area is flexibly allocated according to data capacity to be recorded in each of the recording layers, the middle area is allocated behind the data area, and the dedicated area is allocated behind the middle area. The dedicated area for a special purpose may selectively be allocated in an outer circumferential area of the information storage medium, i.e., an optical disk including a plurality of recording layers. In particular, optical disks in various formats are provided in which dedicated areas for special purposes can selectively be allocated in outer circumferential areas of the optical disks depending on recording characteristics of the optical disks and the outer circumferential areas.

15 Claims, 17 Drawing Sheets

U.S. PATENT DOCUMENTS

| | | |
|---|---|---|
| 2004/0136292 A1* | 7/2004 | Park et al. ............... 369/53.17 |
| 2004/0165495 A1 | 8/2004 | Park et al. |
| 2004/0184778 A1 | 9/2004 | Jung et al. |
| 2005/0030873 A1 | 2/2005 | Sasaki |
| 2005/0190685 A1 | 9/2005 | Lee et al. |
| 2005/0226133 A1 | 10/2005 | Ueki |
| 2006/0013118 A1 | 1/2006 | Ishida et al. |
| 2006/0077879 A1 | 4/2006 | Suh |
| 2006/0087958 A1* | 4/2006 | Hwang et al. ............ 369/275.1 |
| 2007/0140098 A1 | 6/2007 | Kuroda et al. |
| 2007/0177472 A1 | 8/2007 | Miura et al. |
| 2007/0201335 A1 | 8/2007 | Yoshida et al. |
| 2007/0201343 A1 | 8/2007 | Kuroda et al. |
| 2008/0095024 A1 | 4/2008 | Suzuki et al. |
| 2008/0232232 A1 | 9/2008 | Kuroda et al. |

FOREIGN PATENT DOCUMENTS

| | | |
|---|---|---|
| JP | 9-69264 | 3/1997 |
| JP | 2004-310972 | 11/2004 |
| KR | 2003-11102 | 2/2003 |
| TW | 200304646 | 10/2003 |
| TW | 200409090 | 6/2004 |
| WO | WO 2005/004117 | 1/2005 |
| WO | WO 2005/004119 | 1/2005 |
| WO | WO 2005/020231 | 3/2005 |
| WO | WO 2005/083690 | 9/2005 |
| WO | WO 2006/001621 | 1/2006 |

OTHER PUBLICATIONS

Search Report and Written Opinion issued in International Patent Application No. PCT/KR2005/002217 on Oct. 18, 2005.

Supplementary European Search Report dated Jun. 26, 2008 of the European Patent Application No. 05774407.0.

Office Action issued in Taiwanese Patent Application No. 09820112610 on Feb. 27, 2009.

U.S. Appl. No. 11/177,595, filed Jul. 11, 2005, Kyung-geun Lee, Samsung Electronics Co., Ltd.

* cited by examiner

FIG. 1A (PRIOR ART)

| INNER ZONE | | DESCRIPTION | PURPOSE |
|---|---|---|---|
| LEAD-IN | PRE-RECORDED ZONE | CONTROL DATA ZONE | INFORMATION REGARDING DISK & COPY PROTECTION |
| | REWRITABLE AREA | BUFFER | ... |
| | | RESERVED | FUTURE EXTENSION |
| | | TEST ZONE | OPTIMUM POWER TEST ZONE |
| | | INFORMATION ZONE | INFORMATION REGARDING RECORDING/REPRODUCING APPARATUS OR DISK STATUS |
| USER DATA AREA | | | |
| LEAD-OUT | | | – |

FIG. 1B (PRIOR ART)

| INNER ZONE | | DESCRIPTION | PURPOSE |
|---|---|---|---|
| LEAD-IN | PRE-RECORDED ZONE | CONTROL DATA ZONE | INFORMATION REGARDING DISK & COPY PROTECTION |
| | READ ONLY AREA | BUFFER | ... |
| | | RESERVED | ... |
| USER DATA AREA | | | |
| LEAD-OUT | | | – |

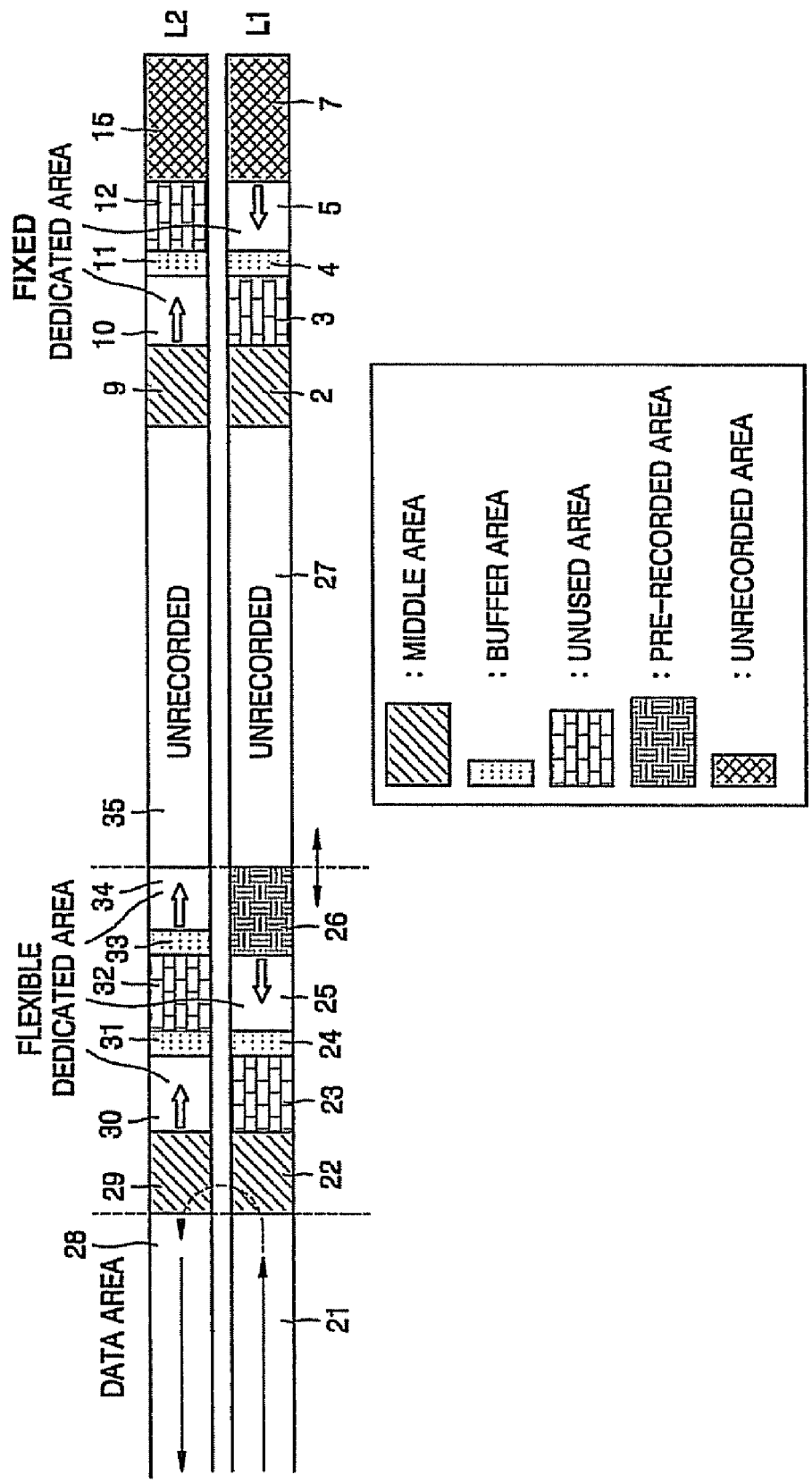

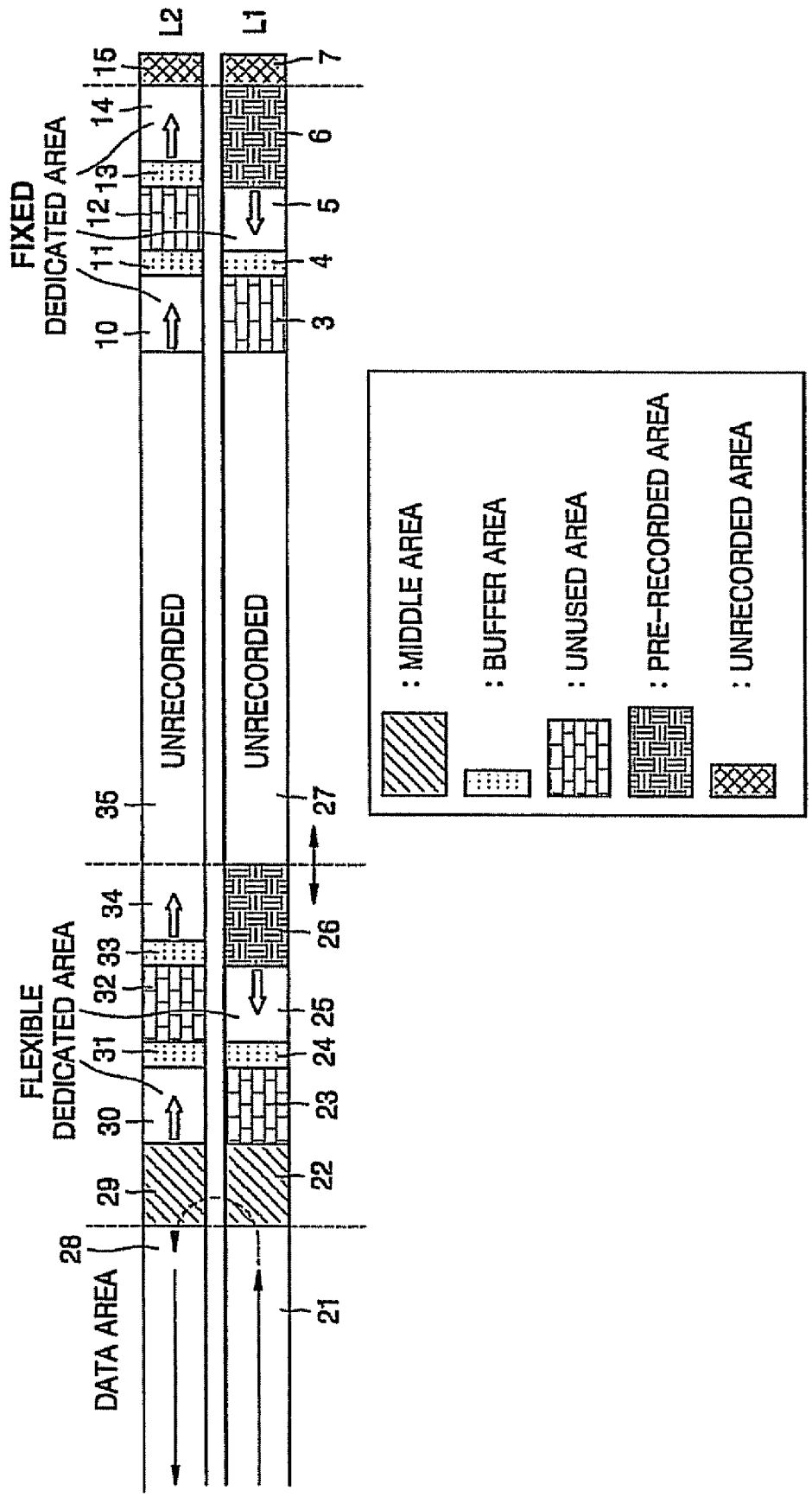

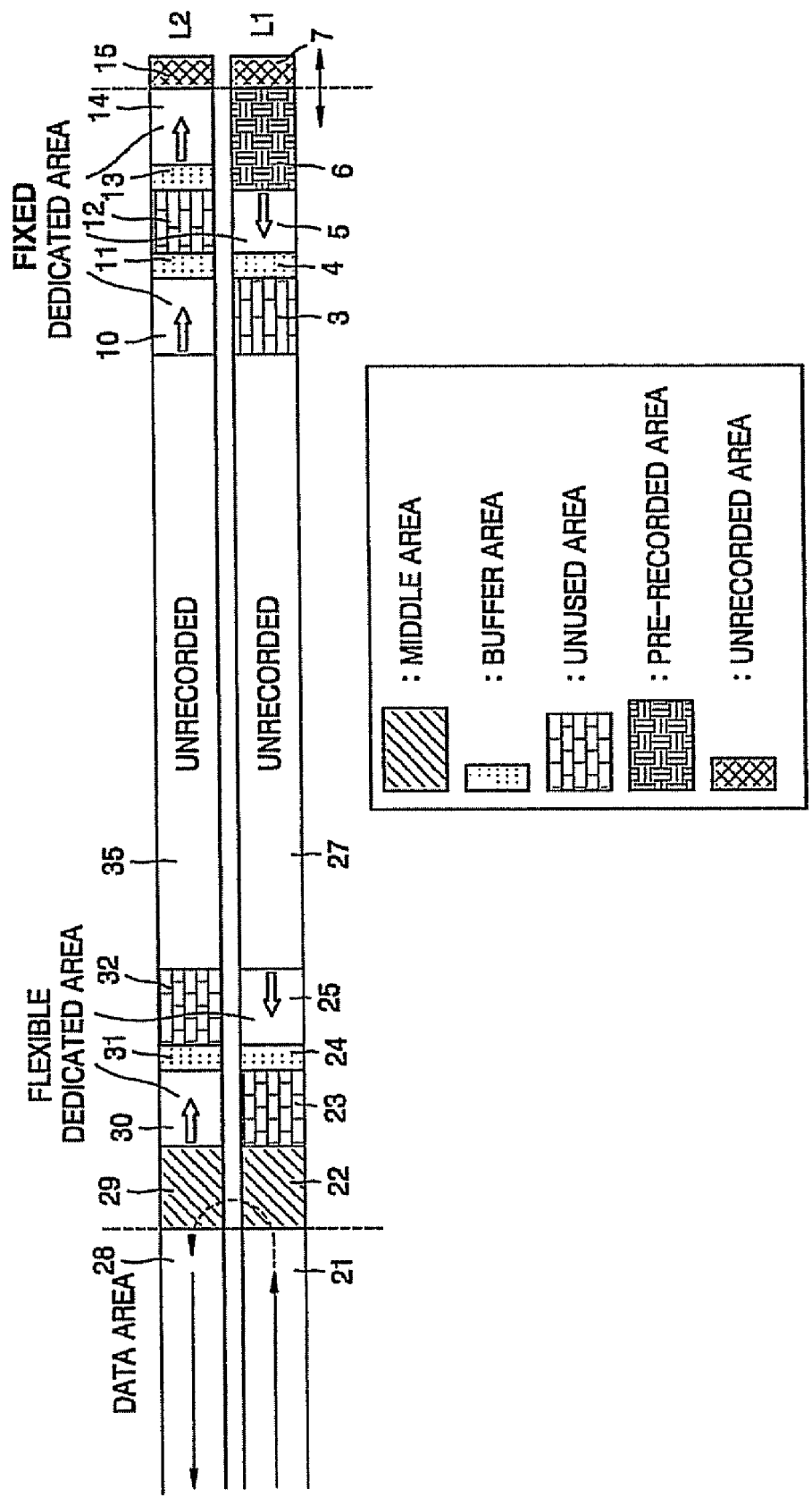

INFORMATION STORAGE MEDIUM, AND RECORDING/REPRODUCING APPARATUS AND METHOD

CROSS-REFERENCE TO RELATED APPLICATION

This application is a divisional of U.S. patent application Ser. No. 11/177,595 filed Jul. 11, 2005 now U.S. Pat. No. 7,652,973, which claims the priority of Korean Patent Application No. 10-2004-0053784, filed on Jul. 10, 2004 in the Korean Intellectual Property Office, the disclosure of which is incorporated herein in its entirety by reference.

BACKGROUND OF THE INVENTION

1. Field of the Invention

An aspect of the present invention relates to an information storage medium including a plurality of recording layers, and more particularly, to an information storage medium, i.e., an optical disk, including a dedicated area for a predetermined purpose in an outer circumferential area thereof, and a recording/reproducing apparatus and method.

2. Description of the Related Art

Optical disks are information storage mediums widely used in optical pick-up devices, which record/reproduce information in a contactless manner. Optical disks are divided into compact disks (CDs) and digital versatile disks (DVD) according to data recording capacity. Optical disks that can be recorded, deleted, and reproduced include 650 MB CD-Rs, CD-rewritables (RWs), 4.7 GB DVD+R/RWs, DVD-random access memories (RAMs), and DVD-R/RWs. Optical disks dedicated for data reproduction include 650 MB CDs and 4.7 GB DVD-ROMs. Further, next-generation DVDs having recording capacity of 15 GB or greater are under development.

FIG. 1A illustrates the structure of a conventional rewritable optical disk. FIG. 1B illustrates the structure of a conventional optical disk for data reproduction. A lead-out area and a lead-in area of the rewritable optical disk illustrated in FIG. 1A are almost identical. The lead-in area of the rewritable optical disk illustrated in FIG. 1A includes a control data zone where information regarding the rewritable optical disk and copy protection is pre-recorded. A rewritable area of the lead-in area includes a buffer zone, a reserved zone for future use, an optimum power test zone for optimum power control (OPC), and an information zone where information regarding a data recording/reproducing apparatus or the status of the rewritable optical disk is recorded. The optimum power test zone is not required in the optical disk for data reproduction.

OPC deals with recording user data in the optimum power test zone using various recording powers before the recording and/or reproducing apparatus records the user data on the rewritable optical disk and then determining an optimum recording power.

In the conventional rewritable optical disk, the optimum power test zone of a fixed size is allocated at a fixed location. Thus, it is not possible to include an additional optimum power test zone or increase the size of the optimum power test zone. Since recording characteristics of an optical disk including a plurality of recording layers depend on which recording layer data is recorded first, the optimum power test zone for OPC should be placed in consideration of the recording characteristics of the optical disk. In particular, when the optimum power test zone is allocated in an outer circumferential area of the optical disk, recording characteristics of the outer circumferential area must be considered.

The recording characteristics of the outer circumferential area of the optical disk including a plurality of recording layers are poorer than those of an outer circumferential area of an optical disk having a single recording layer, which must also be taken into consideration. Similarly, when an area for other purposes is allocated in the outer circumferential area of the optical disk in addition to the optimum power test zone, the recording characteristics of the outer circumferential area must be considered.

For an optical disk including two recording layers L1 and L2, recording characteristics of the recording layer L2 depend on whether data has been recorded in the recording layer L1 close to a pick-up unit. In the case of sequential data recording, data is always recorded first in the recording layer L1. When test data is recorded in the optimum power test zone for OPC included in the recording layer L2, a pre-recorded zone should be allocated in the recording layer L1 in advance since the test data must be recorded first in the recording layer L1.

However, the allocation of the pre-recorded zone increases the manufacturing cost of the data recording and/or reproducing apparatus. Hence, whether to allocate the pre-recorded zone and the optimum power test zone for OPC needs to be selectively determined. In this case, the optical disk requires an OPC zone at a predetermined location and an OPC zone that can selectively be used by a drive.

In terms of time, to effectively record data in the outer circumferential area of an optical disk having two recording layers L1 and L2, the position of a middle area in the optical disk may be different from the same position in an optical disk having a single recording layer. In this case, diverse layouts of the optical disk having the two recording layers L1 and L2 are required to allocate the optimum power test zone for OPC in the outer circumferential area.

The same considerations regarding the allocation of the optimum power test zone must be made when a dedicated area for other purposes is allocated in the outer circumferential area of the optical disk.

SUMMARY OF THE INVENTION

According to an aspect of the present invention, there is provided an information storage medium, i.e., an optical disk, including a plurality of recording layers in which a dedicated area for a predetermined purpose can selectively be allocated in an outer circumferential area of the information storage medium in consideration of recording characteristics of the information storage medium and the outer circumferential area thereof, and a recording/reproducing apparatus and method.

According to an aspect of the present invention, there is provided an information storage medium including a plurality of recording layers, each layer including a lead-in area or a lead-out area, a data area, a middle area, and a dedicated area, wherein the data area is allocated flexibly according to capacity of data to be recorded in each of the recording layers, the middle area is allocated behind the data area, and the dedicated area is allocated behind the middle area.

According to another aspect of the present invention, the dedicated area may be adjacent to the middle area and extend from after the middle area up to an outer circumference of each of the recording layers. Alternatively, the dedicated area may be adjacent to the middle area and have a predetermined size.

According to another aspect of the present invention, a start position and capacity of the dedicated area may be predetermined. The dedicated area may be for testing data recording or reproducing conditions.

According to another aspect of the present invention, there is provided an information storage medium including: a first recording layer including a first data area flexibly allocated according to capacity of data to be recorded on the information storage medium, a first flexible dedicated area part flexibly allocated according to the allocated first data area, and a first fixed dedicated area part; and a second recording layer including a second data area flexibly allocated according to the capacity of the data to be recorded on the information storage medium, a second flexible dedicated area part flexibly allocated according to the allocated second data area, and a second fixed dedicated area part.

According to another aspect of the present invention, the first fixed dedicated area part may include a first dedicated area and the second fixed dedicated area part includes a second dedicated area, wherein no data may be recorded in a first corresponding area of the second recording layer, which corresponds to the first dedicated area, and in a second corresponding area of the first recording layer, which corresponds to the second dedicated area.

According to another aspect of the present invention, data recording directions in the first dedicated area and the second dedicated area may face each other, and end positions of the first dedicated area and the second dedicated area may be flexibly determined.

According to another aspect of the present invention, a first buffer area may be interposed between the first corresponding area and the first dedicated area and a second buffer area may be interposed between the second corresponding area and the second dedicated area in consideration of an area that cannot be used since the area comes within a radius of a beam extending over the first recording layer when data is recorded in the second recording layer.

According to another aspect of the present invention, the first fixed dedicated area part may further include a first middle area at a predetermined position in front of the first dedicated area, and the second fixed dedicated area part may further include a second middle area at a predetermined position in front of the second dedicated area.

According to another aspect of the present invention, the second fixed dedicated area part may further include a third dedicated area, and data may be recorded in a third corresponding area of the first recording layer, which corresponds to the third dedicated area, before the third dedicated area is used. An end position of the third dedicated area may be flexible or fixed.

According to another aspect of the present invention, the first fixed dedicated area part may further include the first middle area at the predetermined position in front of the first dedicated area, and the second fixed dedicated area part may further include the second middle area at the predetermined position in front of the second dedicated area.

According to another aspect of the present invention, the first flexible dedicated area part may include a third middle area and a fourth dedicated area, and the second flexible dedicated area part may include a fourth middle area and a fifth dedicated area, wherein no data may be recorded in a fourth corresponding area of the second recording layer, which corresponds to the fourth dedicated area, and in a fifth corresponding area of the first recording layer, which corresponds to the fifth dedicated area.

According to another aspect of the present invention, data recording directions in the fourth dedicated area and the fifth dedicated area may face each other, and end positions of the fourth dedicated area and the fifth dedicated area may be flexibly determined.

According to another aspect of the present invention, a third buffer area may be interposed between the fifth corresponding area and the fourth dedicated area and a fourth buffer area may be interposed between the fourth corresponding area and the fifth dedicated area in consideration of the area that cannot be used since the area comes within the radius of the beam extending over the first recording layer when data is recorded in the second recording layer.

According to another aspect of the present invention, the second flexible dedicated area part may further include a sixth dedicated area, and data may be recorded in a sixth corresponding area of the first recording layer, which corresponds to the sixth dedicated area, before the sixth dedicated area is used. An end position of the sixth dedicated area may be flexible or fixed.

According to another aspect of the present invention, no data may be recorded in an area between the first flexible dedicated area part and the first fixed dedicated area part and an area between the second flexible dedicated area part and the second fixed dedicated area part.

According to another aspect of the present invention, there is provided a recording/reproducing apparatus including: a writing/reading unit recording data on an information storage medium or reading the data from the information storage medium including a plurality of recording layers, each layer including a lead-in area or a lead-out area, a data area, a middle area, and a dedicated area; and a control unit flexibly allocating the data area according to capacity of data to be recorded in the recording layers, allocating the middle area behind the data area, allocating the dedicated area behind the middle area, and controlling the writing/reading unit to record the data on the information storage medium or read the data from the information storage medium.

According to another aspect of the present invention, there is provided a recording/reproducing apparatus including: a writing/reading unit recording data on an information storage medium including a plurality of recording layers or reading the data from the information storage medium; and a control unit flexibly allocating a first data area according to capacity of data to be recorded on the information storage medium, a first flexible dedicated area part according to the allocated first data area and a first fixed dedicated area part to a first recording layer of the information storage medium, flexibly allocating a second data area according to the capacity of the data to be recorded on the information storage medium, a second flexible dedicated area part according to the allocated second data area and a second fixed dedicated area part to a second recording layer of the information storage medium, and controlling the writing/reading unit to record the data on the information storage medium or read the data from the information storage medium.

According to another aspect of the present invention, there is provided a recording/reproducing method including: flexibly allocating a data area according to capacity of data to be recorded in a plurality of recording layers, allocating a middle area behind the data area, and allocating a dedicated area behind the middle area to an information storage medium including the recording layers, each including a lead-in area or a lead-out area, the data area, the middle area, and the dedicated area and recording the data on the information storage medium or reading the data from the information storage medium.

According to another aspect of the present invention, there is provided a recording/reproducing method including: flexibly allocating a first data area according to capacity of data to be recorded on an information storage medium, a first flexible dedicated area part according to the allocated first data area and a first fixed dedicated area part to a first recording layer of the information storage medium; flexibly allocating a second data area according to the capacity of the data to be recorded on the information storage medium, a second flexible dedicated area part according to the allocated second data area and a second fixed dedicated area part to a second recording layer of the information storage medium; and record the data on the information storage medium or reading the data from the information storage medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1A illustrates the structure of a conventional rewritable optical disk;

FIG. 1B illustrates the structure of a conventional optical disk dedicated for data reproduction;

FIGS. 5A and 5B illustrate the structure of optical disks according to another embodiment of the present invention;

FIGS. 7A and 7B illustrate the structure of optical disks according to another embodiment of the present invention;

FIGS. 9A and 9B illustrate the structure of optical disks according to another embodiment of the present invention.

DETAILED DESCRIPTION OF THE EMBODIMENTS

Figure 2A:
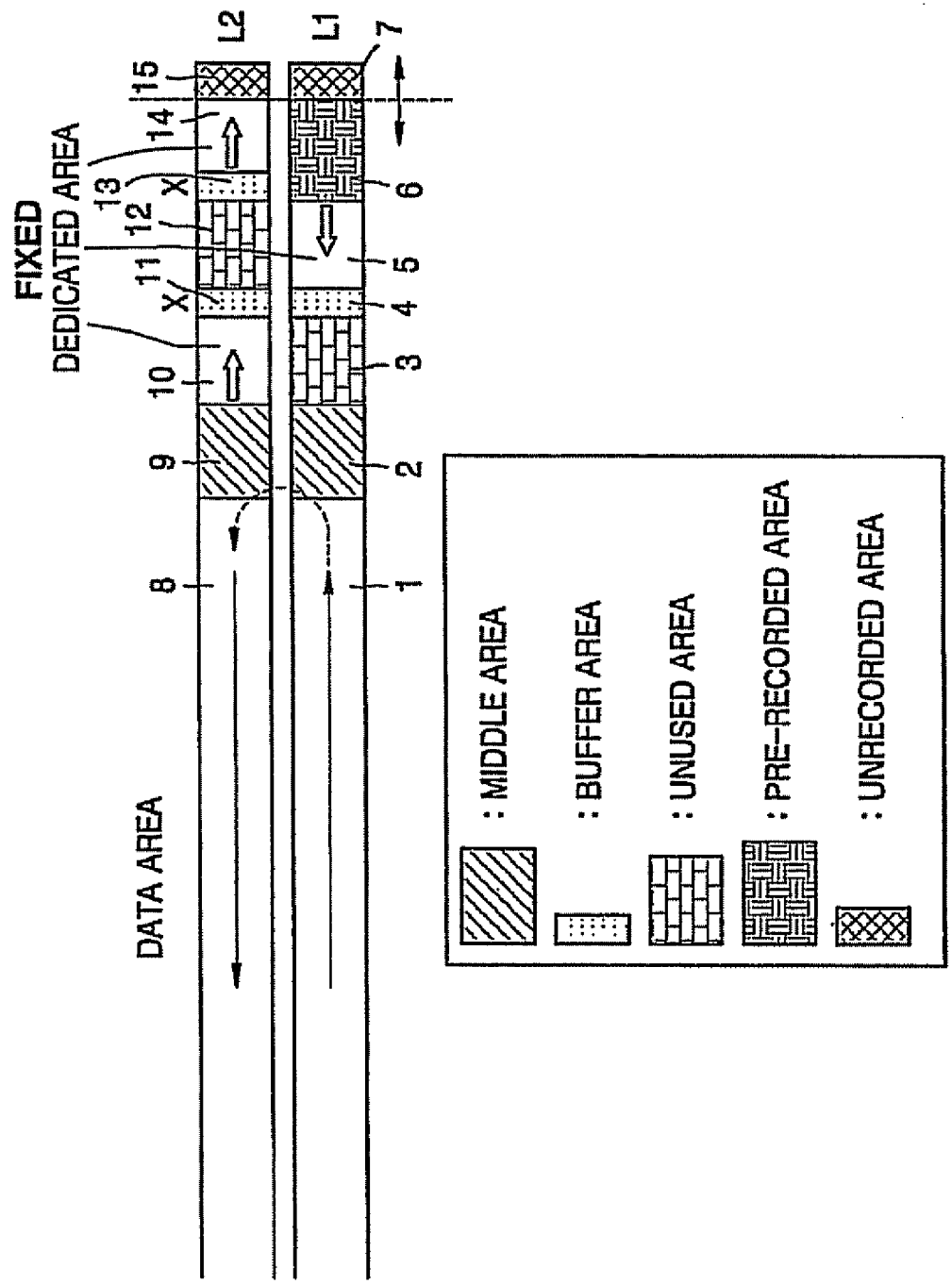
FIGS. 2A and 2B illustrate the structure of optical disks according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2B:
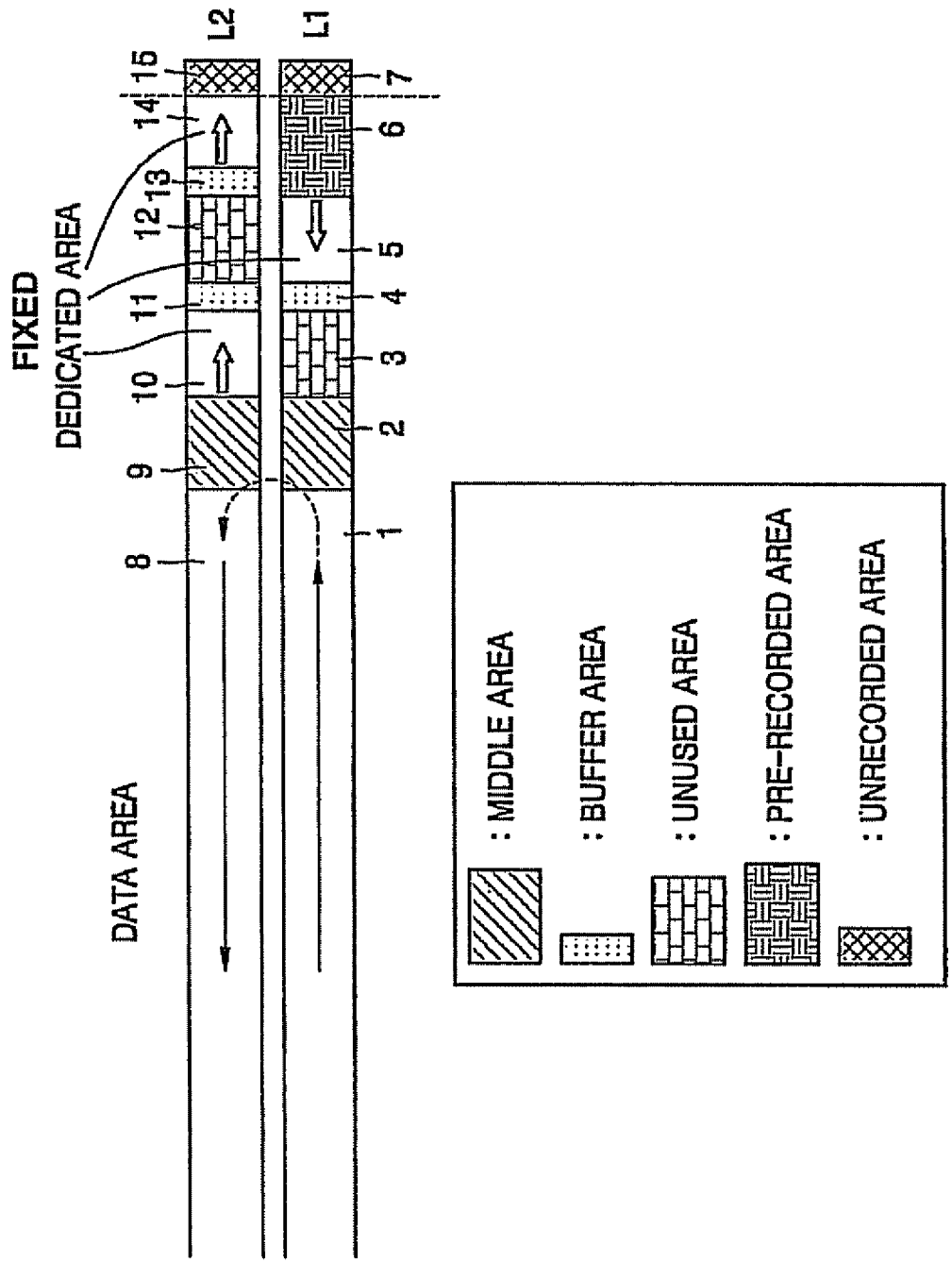

FIGS. 2A and 2B illustrate the structure of optical disks according to an embodiment of the present invention. The optical disks illustrated in FIGS. 2A and 2B are dual-layer optical disks, each including two recording layers L1 and L2.

Referring to FIG. 2A, the recording layer L1 includes a first data area 1 and a first outer area. The first outer area includes a first middle area 2, a first unused area 3, a first buffer area 4, a first fixed dedicated area 5, a first pre-recorded area 6, and a first unrecorded area 7 sequentially disposed from an inner circumference of an outer circumference thereof. The recording layer L2 includes a second data area 8 and a second outer area. The second outer area includes a second middle area 9, a second fixed dedicated area 10, a second buffer area 11, a second unused area 12, a third buffer area 13, a third fixed dedicated area 14, and a second unrecorded area 15.

The first data area 1 and the second data area 8 are areas where user data is recorded. In the first middle area 2 and the second middle area 9, a predetermined pattern of data indicating the end of the first and second data areas 1 and 8 is recorded. A data recording and/or reproducing apparatus reads and decodes the predetermined pattern of data and recognizes that the areas in which the predetermined pattern of data is recorded are the first and second middle areas 2 and 9, not the first and second data areas 1 and 8. Generally, the predetermined pattern of data has lead-out properties.

The first through third fixed dedicated areas 5, 10, and 14 are used by the data recording and/or reproducing apparatus for special purposes. For example, the first through third fixed dedicated areas 5, 10, and 14 may be used as test areas for optimum power control (OPC). The first through third fixed dedicated area 5, 10, and 14 may be used for other purposes than as the test areas. For example, information regarding data recording performed before a drive records user data may be recorded in the first through third fixed dedicated areas 5, 10, and 14. Also, information regarding what is recorded by which data recording and/or reproducing apparatus may be recorded in the first through third fixed dedicated areas 5, 10, and 14.

As their name indicates, the first and second unused areas 3 and 12 are areas that are not used at all. Recording characteristics of optical disks including a plurality of rewritable recording layers depend on which recording layer data is recorded first. In particular, inner circumferential areas of the optical disks have poorer recording characteristics than outer circumferential areas thereof. Therefore, an area in the recording layer L2, which corresponds to the first dedicated area 5 in the recording layer L1, is designated as the second unused area 12 such that no data is recorded in the second unused area 12. Similarly, an area in the recording layer L1, which corresponds to the second dedicated area 10, is designated as the first unused area 3 such that no data is recorded in the first unused area 3.

If the first and second fixed dedicated areas 5 and 10 are used as test areas and data is to be recorded in the recording layer L2, a laser beam passes through the recording layer L1 and is incident on the recording layer L2. The laser beam passes through the first unused area 3 and data is test-recorded in the second fixed dedicated area 10. Then, a recording condition for the recording layer L2 is identified in consideration of attribute parameters of the recording layer L2 in addition to the test-recording result.

The first, second, and third buffer areas 4, 11, and 13 are formed based on the eccentricity of the optical disk and a size of an irradiated beam. The first, second, and third buffer areas 4, 11, and 13 will now be described in more detail with reference to FIG. 3.

Figure 3:
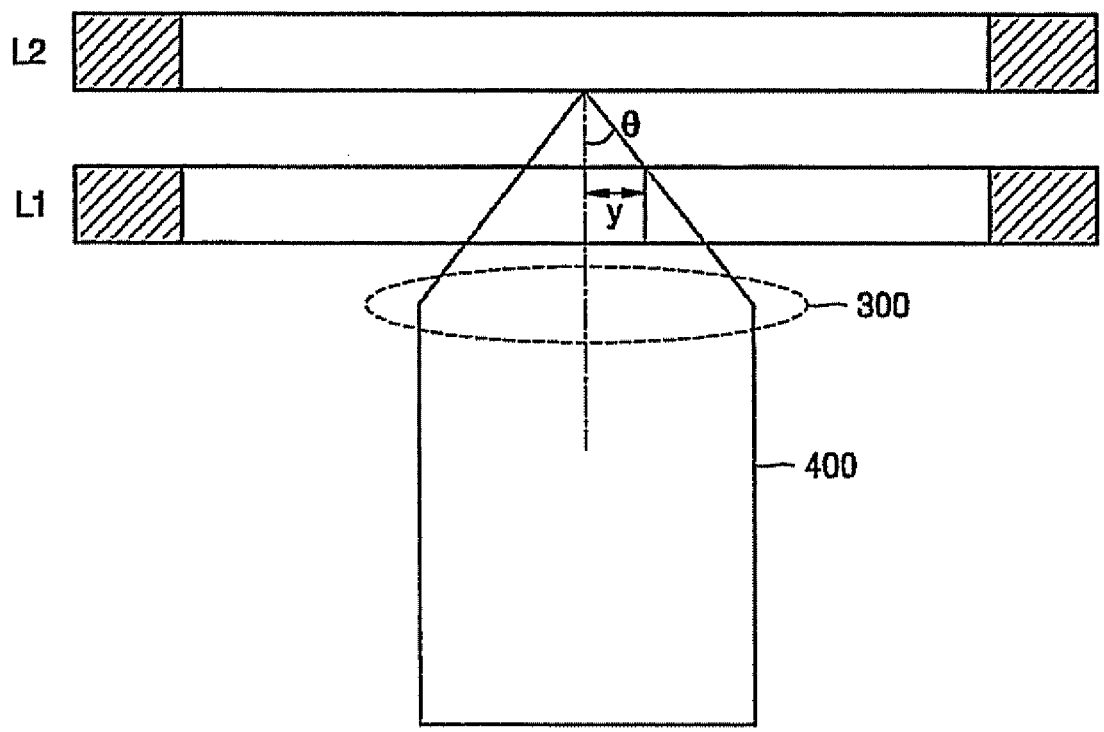
FIG. 3 illustrates a case where a beam irradiated to a recording layer L2 passes through a recording layer L1.

FIG. 3 illustrates the recording layer L1 irradiated by a beam 400 and focusing on the recording layer L2. When the beam 400 is focused on a location in the recording layer L2 though an object lens 300 of the data recording and/or reproducing apparatus, an area in the recording layer L1 corresponding to a radius y of the beam 400 is affected by the beam 400. The sizes of the first, second, and third buffer areas 4, 11, and 13 can be predetermined according to the effects of the beam irradiated to other recording layers to record data, the size of the beam, and the eccentricity of the optical disk.

The first pre-recorded area 6 is for using the third fixed dedicated area 14. Before the third fixed dedicated area 14 is used, data is pre-recorded in the first pre-recorded area 6 in various ways and at various times. For example, a pit may be formed in an area designated as a pre-recorded area before an optical disk is manufactured, and data may be recorded in the pit. Alternatively, data may be recorded in the first pre-recorded area 6 in a predetermined way before the data recording and/or reproducing apparatus uses the third fixed dedicated area 14. In the case of the third fixed dedicated area 14, since data is test-recorded in a state where the recording layer L1 is already recorded, the attribute parameters of the recording layer L2 need not be considered in addition to the test-recording result.

The first and second unrecorded areas 7 and 15 are disposed on the outermost circumference of the optical disk. No data is recorded in the first and second unrecorded areas 7 and 15 due to their poor recording characteristics. The first and second unrecorded areas 7 and 15 may not be allocated. An unrecorded area may be referred to as an unused area for users or a blank area.

Referring to FIG. 2A, the first and second middle areas 2 and 9 are disposed at a predetermined location in the outer circumference of the optical disk. A flexible capacity is allocated to the first, second and third fixed dedicated areas 5, 10 and 14, and the first pre-recorded area 6. An outer circumferential boundary between the third fixed dedicated area 14 and the first pre-recorded area 6 is determined by the data recording and/or reproducing apparatus into which the optical disk is loaded.

The structure of the optical disk illustrated in FIG. 2B is identical to that of the optical disk illustrated in FIG. 2A. However, while the outer circumferential boundary between the third dedicated area 14 and the first pre-recorded area 6 of the optical disk of FIG. 2A is variable, the outer circumferential boundary between a third fixed dedicated area 14 and a pre-recorded area 6 of the optical disk of FIG. 2B is fixed FIGS. 4A through 9B illustrate optical disks including outer areas in various formats to enhance the usability of the outer areas in recording layers when the outer areas increase.

Figure 4A:
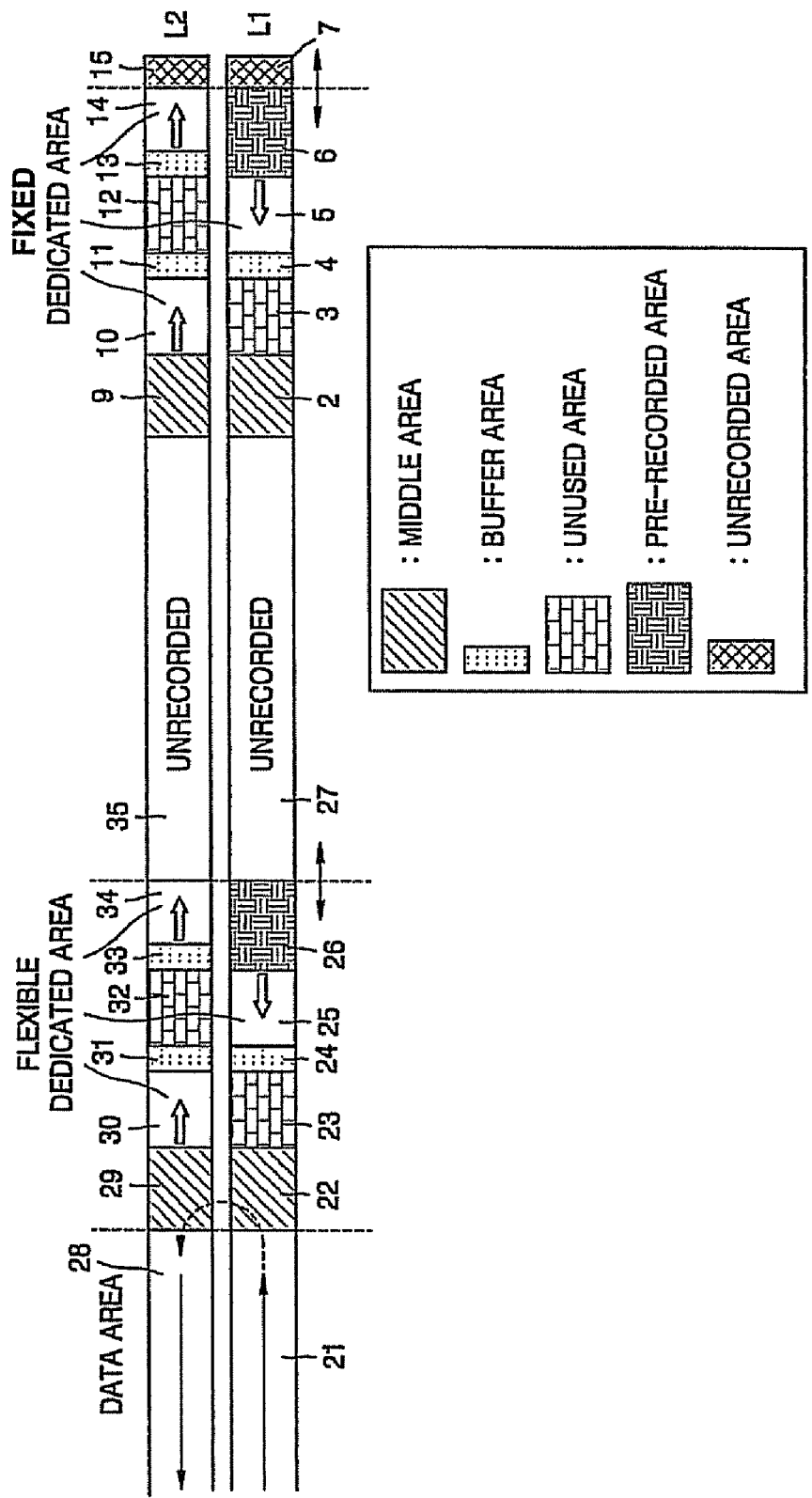
FIGS. 4A and 4B illustrate the structure of optical disks according to another embodiment of the present invention.
Figure 4B:
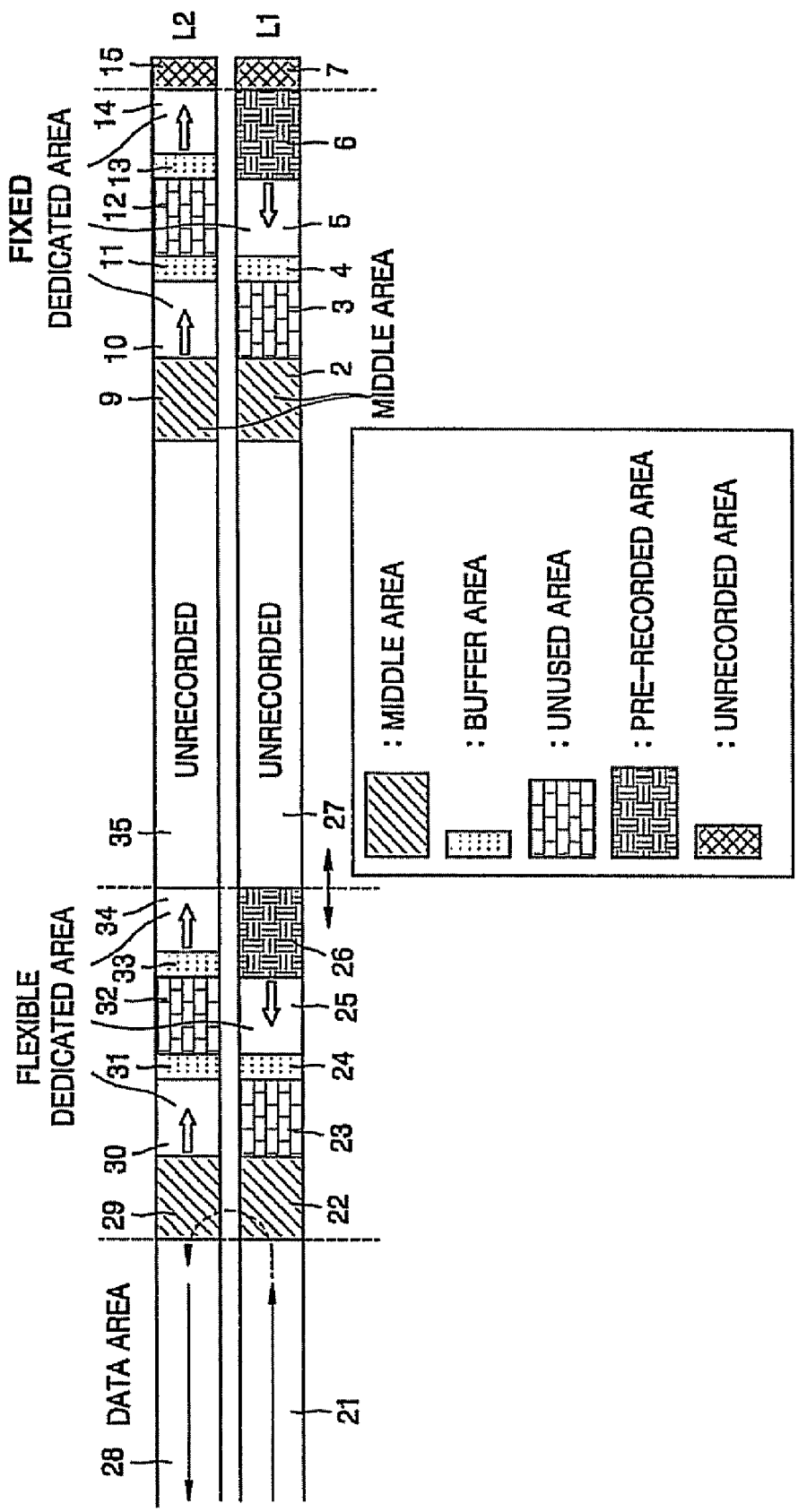

FIGS. 4A and 4B illustrate the structure of the optical disks according to another embodiment of the present invention. Each of the optical disks is a dual-layer optical disk including two recording layers L1 and L2.

In the present embodiment, when data is to be recorded on the optical disk having the two recording layers L1 and L2, if the capacity of user data to be recorded is smaller than a total recordable capacity of the optical disk and can be pre-recognized by the data recording and/or reproducing apparatus, the data recording and/or reproducing apparatus determines the size of a data area in each of the two recording layers L1 and L2 such that the same amount of user data is recorded in the two recording layers L1 and L2. Further, different amounts of user data can be recorded in the two recording layers L1 and L2.

Since a start position of the data area in each of the recording layers L1 and L2 is predetermined, once the size of the data area is determined, an end position of the data area can be determined. The determined size of the data area should be smaller than the original size of the data area, and, accordingly, the size of an outer area in each of the layers L1 and L2 should increase.

Referring to FIG. 4A, the recording layer L1 includes a first data area 21 and a first outer area. The first outer area includes a third middle area 22, a third unused area 23, a fourth buffer area 24, a first flexible dedicated area 25, a second pre-recorded area 26, and a third unrecorded area 27, a first middle area 2, a first unused area 3, a first buffer area 4, a first fixed dedicated area 5, a first pre-recorded area 6, and a first unrecorded area 7 sequentially disposed from an inner circumference of an outer circumference thereof.

In other words, the structure of the first outer area illustrated in FIG. 2A is repeated in the first outer area of the recording layer L1 illustrated in FIG. 4A. However, a start position of the first middle area 2 is fixed, whereas a start position of the third middle area 22 depends on the capacity of the first data area 21.

The recording layer L2 includes a second data area 28 and a second outer area. The second outer area includes a fourth middle area 29, a second flexible dedicated area 30, a fifth buffer area 31, a fourth unused area 32, a sixth buffer area 33, a third flexible dedicated area 34, a fourth unrecorded area 35, a second middle area 9, a second fixed dedicated area 10, a second buffer area 11, a second unused area 12, a third buffer area 13, a third fixed dedicated area 14, and a second unrecorded area 15. In other words, the structure of the second outer area illustrated in FIG. 2A is repeated in the second outer area of the recording layer L2 illustrated in FIG. 4A.

In the optical disk illustrated in FIG. 4A, the outer circumferential boundaries of the second pre-recorded area 26, the third flexible dedicated area 34, the first pre-recorded area 6, and the third fixed dedicated area 14 are variable. The outer circumferential boundary is determined by the data recording and/or reproducing apparatus into which the optical disk according to an embodiment of the present invention is loaded.

While the areas on the right side of the second and fourth unrecorded areas 27 and 35 are always allocated, the allocation of the areas on the left side of the second and fourth unrecorded areas 27 and 35 may selectively be determined by the data recording and/or reproducing apparatus. In addition, when the areas on the left side of the second and fourth unrecorded areas 27 and 35 are allocated, the areas allocated on the right side of the second and fourth unrecorded areas 27 and 35 may be or may not be used.

The structure and usage of the optical disk illustrated in FIG. 4B are identical to those of the optical disk illustrated in FIG. 4A. However, while the outer circumferential boundaries of the second pre-recorded area 26 and the third flexible dedicated area 34 of the optical disk of FIG. 4B are variable, the outer circumferential boundaries of a first pre-recorded area 6 and a third fixed dedicated area 14 are fixed.

Based on the structure of the optical disks illustrated in FIGS. 4A and 4B according to an embodiment of the present invention, the structure and usage of the optical disks according to other embodiments of the present invention will now be described.

Figure 5A:
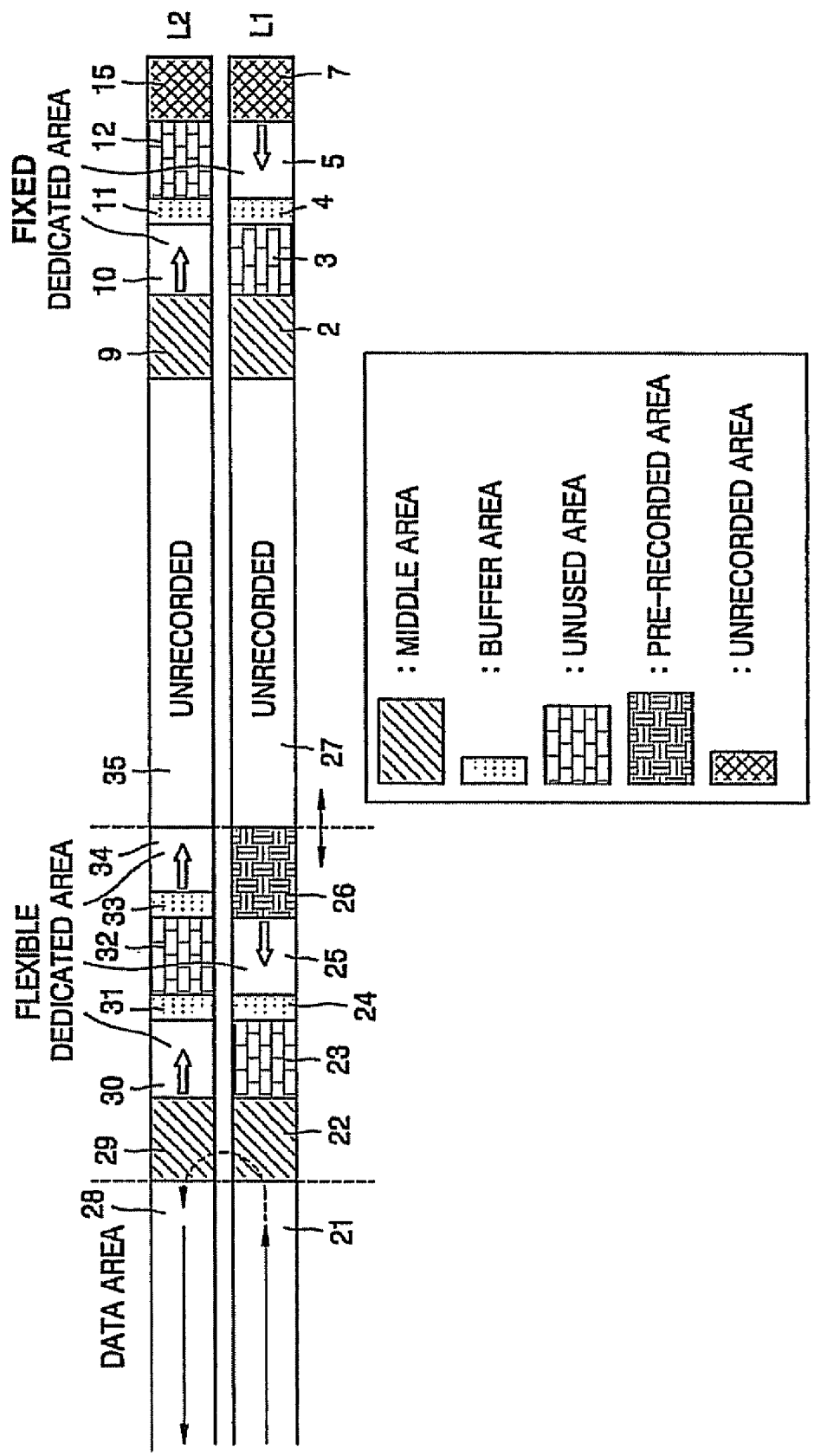

FIGS. 5A and 5B illustrate the structure of the optical disks according to another embodiment of the present invention. The optical disk illustrated in FIG. 5A does not include the first pre-recorded area 6, the third buffer area 13, and the third dedicated area 14 included in the optical disk of FIG. 4A. Similarly, the optical disk illustrated in FIG. 5B does not include the first pre-recorded area 6, the third buffer area 13, and the third dedicated area 14 included in the optical disk of FIG. 4B.

Figure 6A:
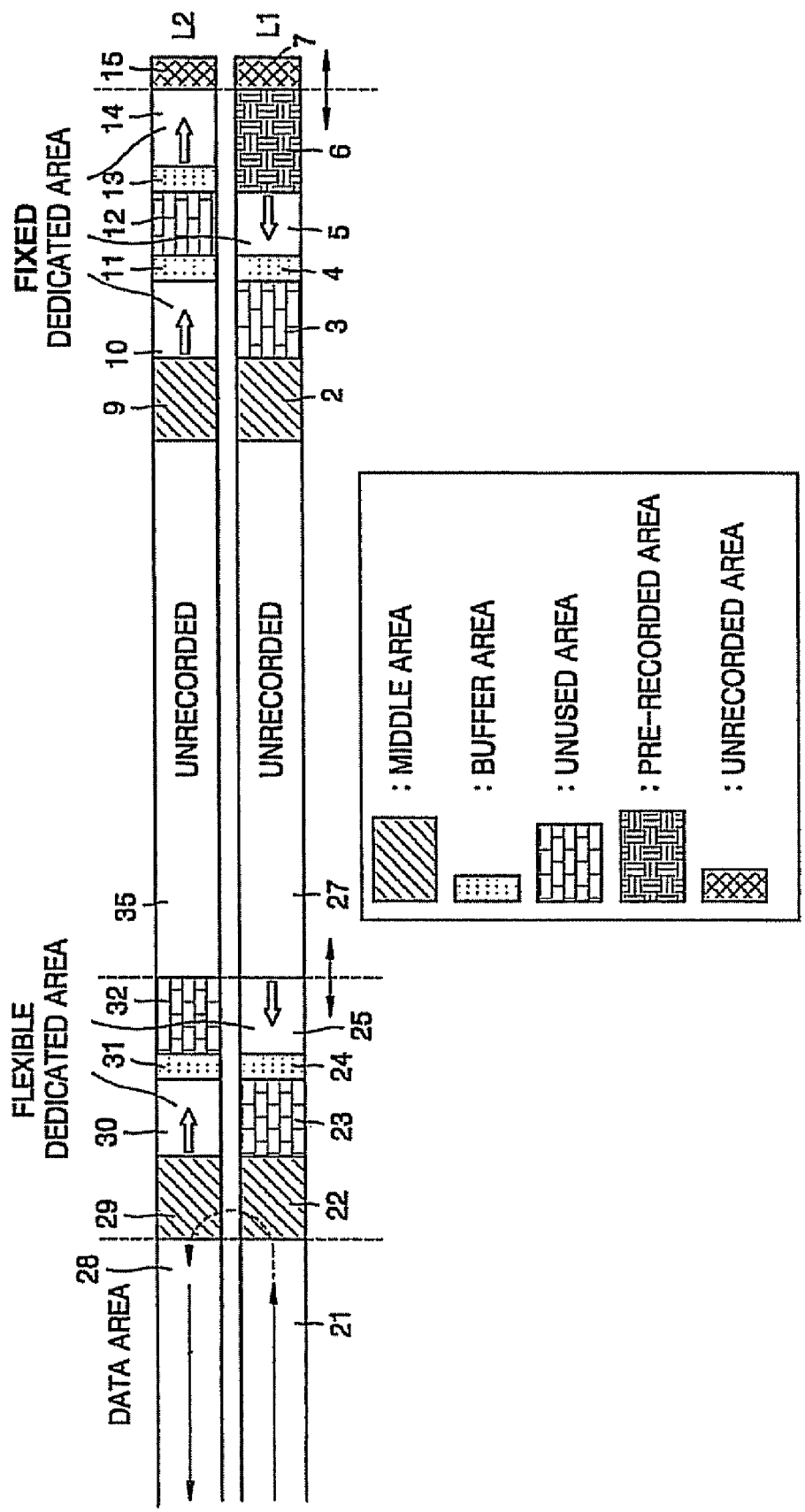
FIGS. 6A and 6B illustrate the structure of optical disks according to another embodiment of the present invention.
Figure 6B:
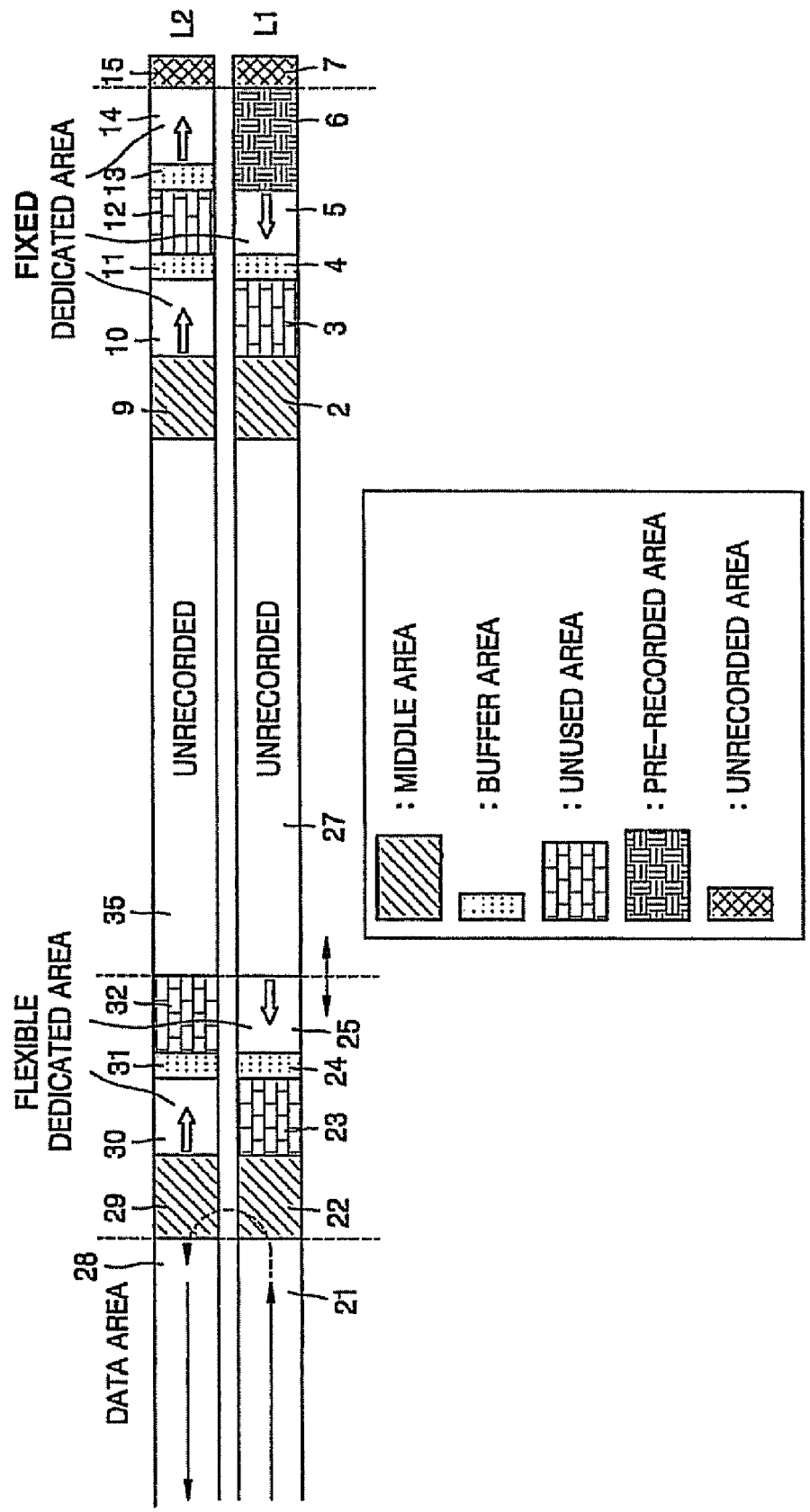

FIGS. 6A and 6B illustrate the structure of optical disks according to another embodiment of the present invention. The optical disk illustrated in FIG. 6A does not include the second pre-recorded area 26, the sixth buffer area 33, and the sixth dedicated area 34 included in the optical disk of FIG. 4A. Similarly, the optical disk illustrated in FIG. 6B does not include the second pre-recorded area 26, the sixth buffer area 33, and the sixth dedicated area 34 included in the optical disk of FIG. 4B.

Figure 7A:
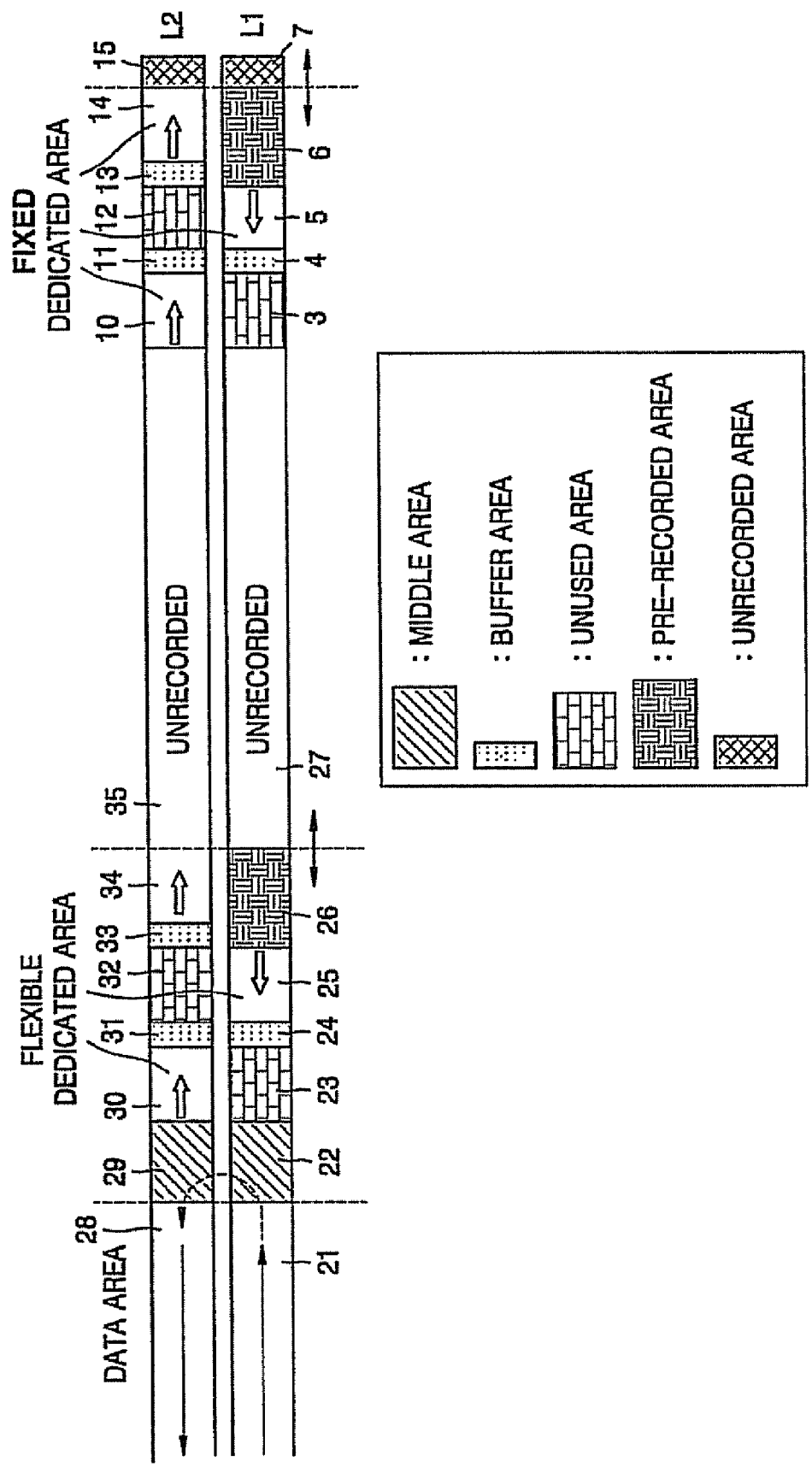

FIGS. 7A and 7B illustrate the structure of optical disks according to another embodiment of the present invention. The optical disk illustrated in FIG. 7A does not include the first and second middle areas 2 and 9 included in the optical disk of FIG. 4A. Similarly, the optical disk illustrated in FIG. 7B does not include the first and second areas 2 and 9 included in the optical disk of FIG. 4B.

Figure 8A:
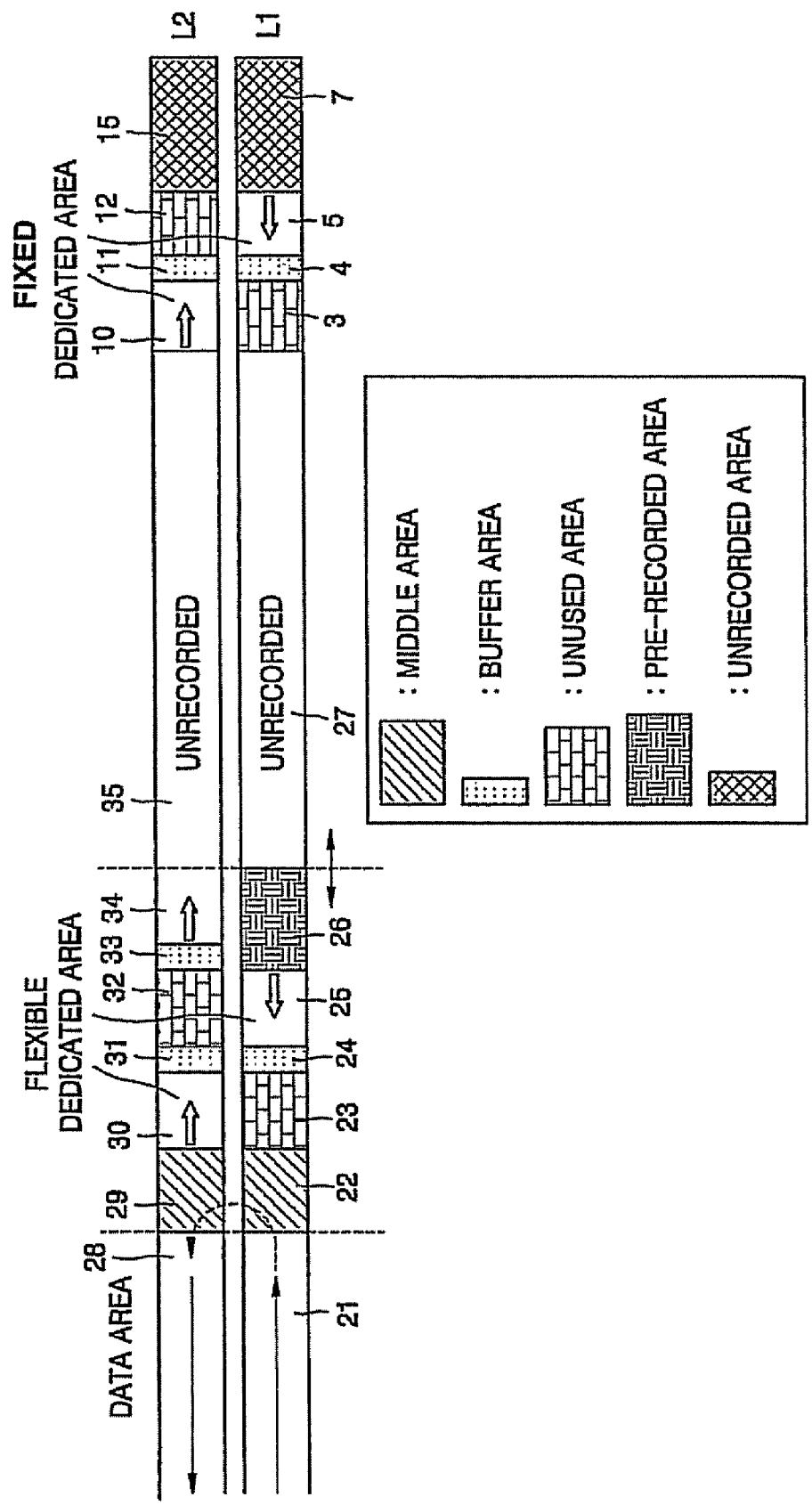
FIGS. 8A and 8B illustrate the structure of optical disks according to another embodiment of the present invention.
Figure 8B:
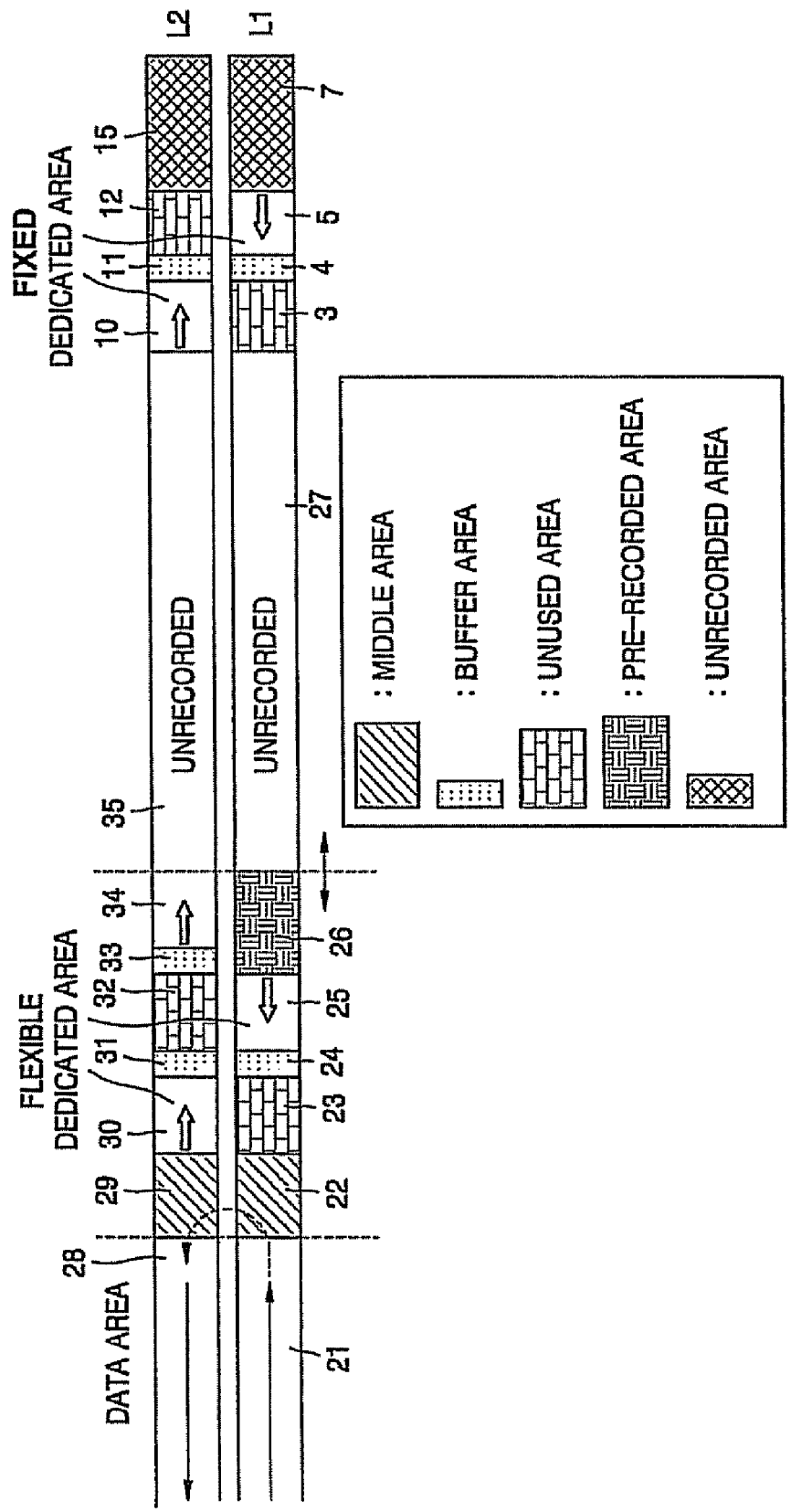

FIGS. 8A and 8B illustrate the structure of optical disks according to another embodiment of the present invention. The optical disk illustrated in FIG. 8A does not include first and second middle areas 2 and 9 included in the optical disk of FIG. 5A. Similarly, the optical disk illustrated in FIG. 8B does not include first and second areas 2 and 9 included in the optical disk of FIG. 5B.

Figure 9B:
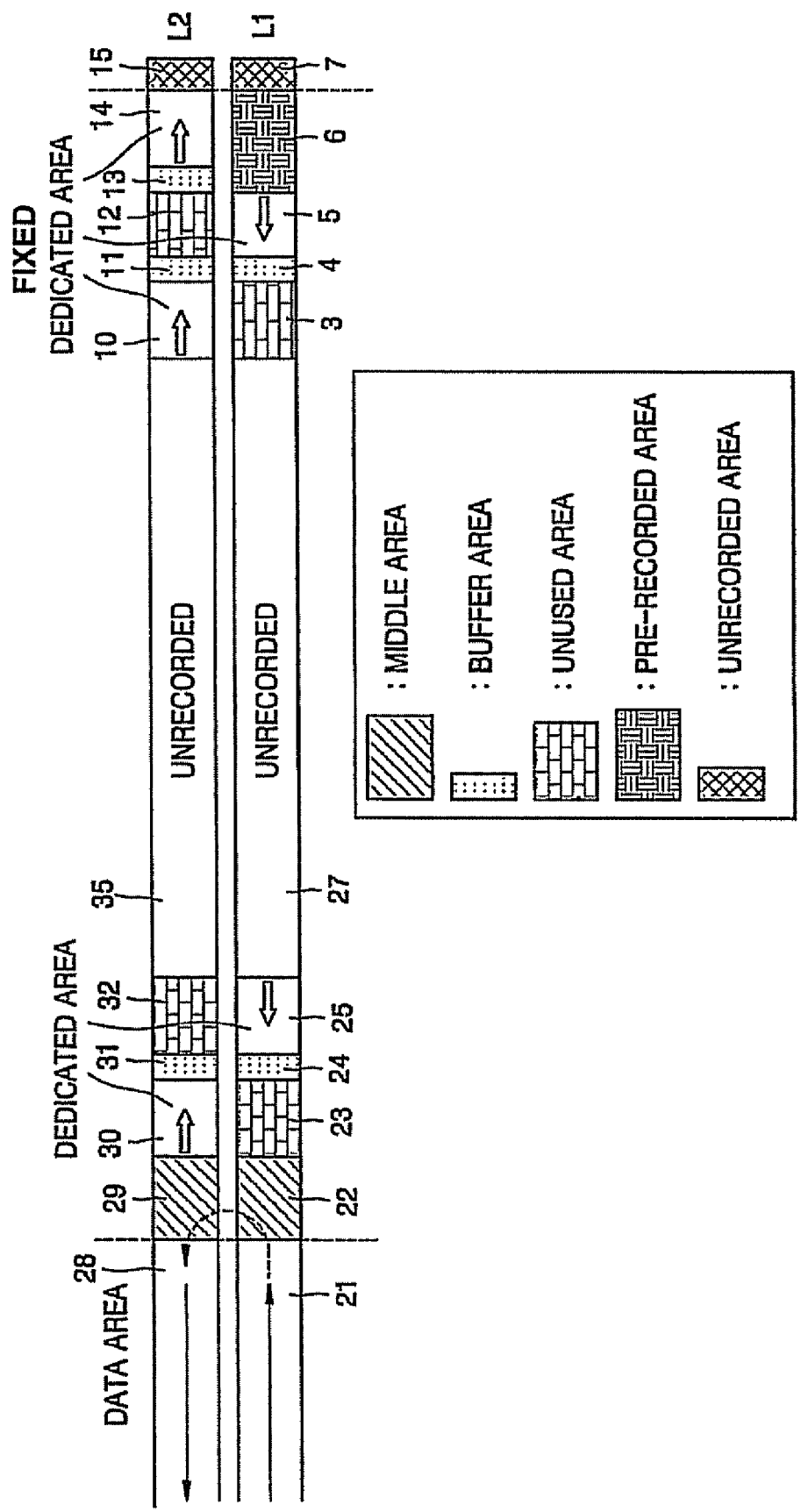

FIGS. 9A and 9B illustrate the structure of optical disks according to another embodiment of the present invention. The optical disk illustrated in FIG. 9A does not include first and second middle areas 2 and 9 included in the optical disk of FIG. 6A. Similarly, the optical disk illustrated in FIG. 9B does not include first and second areas 2 and 9 included in the optical disk of FIG. 6B.

Optical disks having double recording layers have been described above. Optical disks having two or more recording layers may have the same structure and usage as the optical disks having double recording layers.

In addition, recording data on the optical disks in an opposite track pass (OTP) direction has been described above, but data may also be recorded in a parallel track pass (PTP) direction.

Further, data may be recorded in a middle area using a pre-recording method or a pre-embossed method. Alternatively, data may be recorded in the middle area by the recording and/or reproducing apparatus after a data area is used by the data recording and/or reproducing apparatus.

Figure 10:
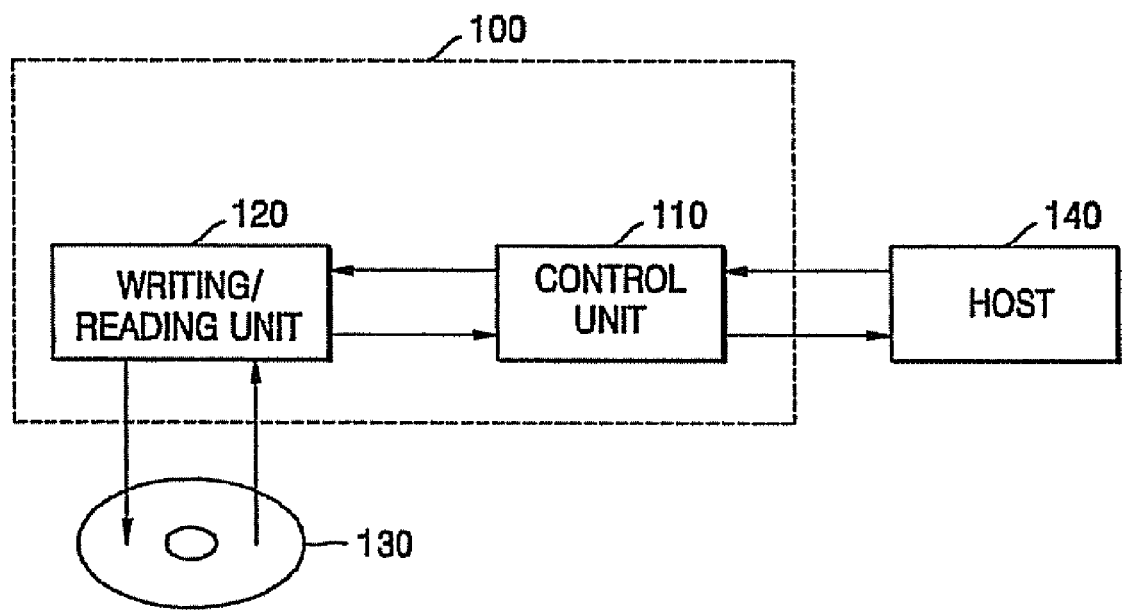
FIG. 10 is a schematic diagram of a recording/reproducing apparatus according to another embodiment of the present invention.

FIG. 10 is a schematic diagram of a recording/reproducing apparatus 100 that allocates disk space according to an embodiment of the present invention. Referring to FIG. 10, the recording/reproducing apparatus 100 includes a writing/reading unit 120 and a control unit 110. The writing/reading unit 120 records data in a disk 130, which is an information storage medium according to an aspect of the present invention, and reads the recorded data to reproduce the data under the control of the control unit 110. The control unit controls the writing/reading unit 120 to record data in predetermined recording units or processes data read by the writing/reading unit 120 to obtain effective data.

In particular, the control unit 110 may check the capacity of data before the data is recorded on the disk 130, allocate a data area corresponding to the capacity of the data to each of a first recording layer and a second recording layer, and designate the remaining area as a dedicated area. In this case, a middle area indicating the end of the data area may be disposed immediately after the data area and the dedicated area may be disposed after the middle area. The dedicated area may be disposed next to the middle area or disposed at a fixed position regardless of the position of the middle area. Also, the capacity of the dedicated area may be flexible or fixed.

If disk space is allocated as illustrated in FIGS. 2A through 9B, the control unit 110 may determine the position and capacity of a buffer area, a pre-recorded area, or a dedicated area.

As described above, according to another aspect of the present invention, a dedicated area for a special purpose may selectively be allocated in an outer circumferential area of an optical disk including a plurality of recording layers. In particular, according to aspects of the present invention, there are provided optical disks in various formats in which dedicated areas for special purposes can selectively be allocated in outer circumferential areas of the optical disks based on recording characteristics of the optical disks and the outer circumferential areas.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An information storage medium, comprising:
    a plurality of recording layers, each layer comprising:
        a lead-in area and/or a lead-out area;
        a data area;
        a middle area; and
        a fixed dedicated area,
    wherein the data area is flexibly allocated according to a capacity of user data to be recorded in each of the recording layers,
    wherein the middle area is allocated behind the data area, and
    wherein the fixed dedicated area is allocated behind the middle area.

2. The medium of claim 1, wherein the fixed dedicated area is adjacent to the middle area and extends from after the middle area up to an outer circumference of each of the recording layers.

3. The medium of claim 1, wherein the fixed dedicated area is adjacent to the middle area and has a predetermined size.

4. The medium of claim 1, wherein a start position and a capacity of the fixed dedicated area are predetermined.

5. The medium of claim 1, wherein the fixed dedicated area is for testing data recording and/or reproducing conditions.

6. A recording/reproducing apparatus, comprising:
    a writing/reading unit configured to record data on an information storage medium and/or read the data from the information storage medium, the information storage medium comprising a plurality of recording layers, each layer comprising:
        a lead-in area and/or a lead-out area;
        a data area;
        a middle area; and
        a fixed dedicated area; and
    a control unit configured to:
        flexibly allocate the data area according to a capacity of user data to be recorded in the recording layers;
        allocate the middle area behind the data area, allocating the fixed dedicated area behind the middle area; and
        control the writing/reading unit to record the data on the information storage medium and/or read the data from the information storage medium.

7. The apparatus of claim 6, wherein the control unit is further configured to:
    place the fixed dedicated area adjacent to the middle area; and
    allocate a fixed size middle area.

8. The apparatus of claim 6, wherein the control unit is further configured to use the fixed dedicated area to test data recording or reproducing conditions.

9. A recording/reproducing apparatus, comprising:
    a writing/reading unit configured to record data on an information storage medium comprising a plurality of recording layers and/or reading the data from the information storage medium; and
    a control unit configured to:
        flexibly allocate a first data area according to a capacity of data to be recorded on the information storage medium, a first flexible dedicated area part according to the allocated first data area, and a first fixed dedicated area part to a first recording layer of the information storage medium, flexibly allocate a second data area according to the capacity of the data to be recorded on the information storage medium, a second flexible dedicated area part according to the allocated second data area, and a second fixed dedicated area part to a second recording layer of the information storage medium; and control the writing/reading unit to record the data on the information storage medium and/or read the data from the information storage medium.

10. The apparatus of claim 9, wherein:
the first fixed dedicated area part comprises a first dedicated area;
the second fixed dedicated area part comprises a second dedicated area; and
no data is recorded:
   in a first corresponding area of the second recording layer, which corresponds to the first dedicated area, and
   in a second corresponding area of the first recording layer, which corresponds to the second dedicated area.

11. The apparatus of claim 10, wherein the control unit is further configured to:
control the writing/reading unit to record data in the first dedicated area and the second dedicated area in opposite recording directions; and
flexibly determine end positions of the first dedicated area and the second dedicated area.

12. The apparatus of claim 10, wherein:
a first buffer area is interposed between the first corresponding area and the first dedicated area;
a second buffer area is interposed between the second corresponding area and the second dedicated area; and
the first and second buffers are based on an area that is not used since the area is within a radius of a beam extending over the first recording layer when data is recorded in the second recording layer.

13. The apparatus of claim 10, wherein:
the first fixed dedicated area part further comprises a first middle area at a predetermined position in front of the first dedicated area; and
the second fixed dedicated area part further comprises a second middle area at a predetermined position in front of the second dedicated area.

14. The apparatus of claim 10, wherein:
the second fixed dedicated area part further comprises a third dedicated area; and
data is recorded in a third corresponding area of the first recording layer, which corresponds to the third dedicated area, before the third dedicated area is used.

15. The apparatus of claim 14, wherein:
the first fixed dedicated area part further comprises the first middle area at a predetermined position in front of the first dedicated area; and
the second fixed dedicated area part further comprises a second middle area at a predetermined position in front of the second dedicated area.

* * * * *